US005333365A

United States Patent [19]

Marocco et al.

[11] Patent Number: 5,333,365

[45] Date of Patent: Aug. 2, 1994

[54] APPARATUS FOR THE MANUFACTURE OF BLINDS

[76] Inventors: Norbert Marocco, 46 Pennygrass Ct., Woodbridge, Ontario; Ronald W. E. Ingram, 194 Clendenan Avenue, Toronto, Ontario, both of Canada

[21] Appl. No.: 980,436

[22] Filed: Nov. 23, 1992

Related U.S. Application Data

[63] Continuation of Ser. No. 681,957, Apr. 8, 1991, abandoned.

[51] Int. Cl.$^5$ .............................................. B23P 19/04

[52] U.S. Cl. ....................................... 29/24.5; 83/214; 83/562

[58] Field of Search ................ 29/24.5, 433, 430, 791; 83/214, 562, 558

[56] References Cited

U.S. PATENT DOCUMENTS

| | | | |
|---|---|---|---|
| 3,448,645 | 6/1969 | Graf et al. | 83/214 X |
| 3,766,815 | 10/1973 | Edixhoven . | |
| 3,822,958 | 7/1974 | Lewis | 83/562 X |
| 3,824,657 | 7/1974 | Nilsson . | |
| 4,301,958 | 11/1981 | Hatakenaka et al. | 29/430 X |
| 4,516,300 | 5/1985 | Gaillard et al. . | |
| 4,665,599 | 5/1987 | Nilsson | 29/24.5 |
| 4,823,449 | 4/1989 | Chang | 29/24.5 |
| 4,989,483 | 2/1991 | Lacrouts-Cazenave | 83/214 X |

*Primary Examiner*—Joseph M. Gorski

[57] ABSTRACT

Apparatus for the manufacture of blinds of the type having a head rail, a plurality of ladder tapes, plurality of blind slats, and raise cords passing through the blind slats, by which the blind slats may be drawn upwardly toward the head rail, and wherein the apparatus has a die support for passage of strip material along an axis therealong for the formation of blind slats, a plurality of die units mounted on the die support, at least some of said die units being moveable therealong, the die units being aligned with one another along the strip path, the die units being operable to procure their selective operation to form openings in the strip material at pre-selected spaced points, a cut off die for cutting off a pre-selected length of the strip material to form a blind slat, and slat threaders located downstream of the dies for threading a slat through the ladder tapes. Also disclosed is threader apparatus which is moveable laterally relative to the axis of the strip material.

28 Claims, 10 Drawing Sheets

APPARATUS FOR THE MANUFACTURE OF BLINDS

This application is a continuation of application Ser. No. 07/681,957, filed Apr. 8, 1991, and now abandoned.

FIELD OF THE INVENTION

The invention relates to an apparatus for the manufacture of blinds, and in particular for the manufacture of blinds consisting of a plurality of horizontal slats known in the trade as "venetian blinds".

BACKGROUND OF THE INVENTION

Blinds having horizontal slats, are well known in the window covering art. Such blinds are generally known as "venetian blinds". They usually consist of a head rail, a plurality of thin elongated blind slats, and two or more ladder tapes. The ladder tapes consist of pairs of cords or tapes, with generally transverse rung portions extending between them at spaced intervals. The slats are supported on the rungs of the tapes.

Usually means are provided in the head rail for adjusting the relative positions of the two cords or tapes, so that the slats may be tilted one way or the other, to produce different lighting effects within a building space. However, such blinds are not used exclusively for covering windows, but may also be used for covering other spaces and, in many cases, are used for covering, for example, doorway.

In addition to the ladder tapes, such blinds are usually provided with two or more so-called "raise cords".

The raise cords are simply a pair of cords which pass through openings in the blind slats, and are secured to a bottom rail below the lowermost slat. By suitable pulleys and controls within the head rail, the raise cords may be pulled so as to raise all of the slats up until they are lying closely adjacent in a stack underneath the head rail, thereby leaving the window or other space substantially unobstructed.

Many different makes of such blinds are available on the market, and have been available for many years. In the great majority of cases, such blinds incorporate blind slats made of thin sheet metal, usually sheet aluminum. The aluminum may be coated with a wide variety of different paints or other surface finishes, so as to give customers the widest possible choice when selecting such blinds, to suit the decor of the home or building which they are furnishing. Blind manufacturers are, therefore, obliged to stock large quantities of rolls of strip metal, coated with different finishes, and must then be able to select the appropriate strip for a customer's order to manufacture a blind or blinds on a custom basis.

This is naturally somewhat time consuming, and increases the cost of the blind. Certain customers, in fact, require blinds in which slats are incorporated having several different colors, so that when they are lowered down the different colored slats are arranged in groups, and in effect form bars of color across a window space. This poses much more serious difficulties to the manufacturer. The manufacturer must then manufacture the blind not simply of one color of stock, but any one blind may require to be manufactured of several different colors of stock. This additional complication naturally still further increases the cost of blinds of this type.

A further factor in the manufacture of such blinds is that each blind must be substantially custom-made so as to fit the width and height of a particular window space. The manufacturer must therefore be able to select slats of a particular length, cut them off in a predetermined number suitable for the manufacture of that blind, and then assemble them with their ladder tapes and raise cords.

One of the factors adding to the difficulty of this type of manufacture is the fact that the openings for the raise cords are usually and desirably located a more or less standard distance from each end of the blind. Where blinds are made in which the slats in one blind are longer than the slats in another blind, then the punching of these holes at a predetermined distance from each end of each slat presents a still further problem. Equipment for punching such holes must, therefore, either depend almost entirely on relatively primitive hand labor, or alternatively, if automatic machinery is used, its adjustment may become of critical difficulty, requiring highly skilled operators. In the past, all of these factors have been fully appreciated by manufacturers, and machines of various different designs have been proposed for the purpose of making such blinds, but with varying degrees of success. Some machines are capable of only relatively restrictive application, and are not suitable for making blinds with multiple colors. Other machines are of such a design that the adjustment in the length of the blind slats from one customer to another, is excessively slow and laborious and requires much skilled labor to accomplish.

However, the equipment proposed and designed and used in the past has worked reasonably well, although somewhat slowly and laboriously, at least when producing blinds of a single color, and preferably in standard lengths.

However, in recent years, consumers have demanded blinds with slats of various different widths. Thus it is now almost universal throughout the industry that venetian blinds shall be available with slats having either a one inch, or a three-quarter inch, or a half-inch width. Generally speaking, the prior art design of machines would accommodate only one strip of slat material at a time. Consequently, if it was desired to change from one color to another, or if it was desired to change from one width of blind slat to another, it was necessary to stop the machine, change the coil of strip metal, and make various other adjustments and changes in the tooling on the machine, before production could be resumed.

For all of these various reasons, it is clearly desirable to provide a machine which is substantially self-adjusting to different lengths of blind slats, and which is capable of accepting two or more different colored metal strips for producing different colored slats in the same blind, and which is alternatively capable of accepting metal strips of different widths, for producing blinds having slats of different widths, and which is capable of changing over from one length of blind slat to another with a minimum of manual intervention, and which is capable of changing over from one color to the other with a minimum of manual intervention, and which is alternatively capable of changing over from one width of slat to the other with a minimum of manual intervention.

Preferably, such a machine will be controlled by a central processing unit, capable of receiving commands for the manufacture of a whole series of blinds, one after the other, with a minimum of intervention from an operator who essentially will simply input instructions and then supervise the operation of the machine as it carries out its functions on its own, substantially without further manual intervention.

BRIEF SUMMARY OF THE INVENTION

With a view to satisfying the various conflicting objectives described above, the invention comprises apparatus for the manufacture of blinds of the type having a headrail, a plurality of ladder tapes suspended from said headrail, a plurality of blind slats supported by said ladder tapes, and raise cord means passing through openings in said blind slats, whereby said blind slats may be drawn upwardly toward said headrail, and wherein said apparatus further comprises , a plurality of die means mounted on said die support means, at least some of said die means being moveable therealong, said die means being aligned with one another along said strip path whereby a said strip of said material may pass therealong, die operating means operable to procure selective operation of respective ones of said die means, and control means for selecting the same, whereby to form openings in said strip material at pre-selected spaced points therealong, cut off die means for cutting off a pre-selected length of said strip material to form a said slat for a said blind, slat threader means, located downstream of said die means, and defining a predetermined slat threading path for threading a said slat through said ladder tapes, and, movement means supporting said threader means, whereby said threader means may be moved laterally relative to said axis of said die means.

The invention further comprises such an apparatus and wherein there are a plurality of said die means, and at least some of said die means being moveable relative to others of said die means, and including linkage means interconnecting the same, whereby movement of one of said die means is communicated to all of the remaining said connected moveable die means.

The invention further comprises such an apparatus, wherein said movement connection means causes each of said die means to move a distance different from its adjacent said die means, whereby at least selected ones of said die means may be precisely positioned along said path, and thereby form openings in said strip material in desired locations.

The invention further comprises such an apparatus and wherein all of said die means are operable by a single operating means, and including control means for selectively operating individual ones of said die means, through said single operating means.

The invention further comprises such an apparatus for the manufacture of blinds of the type having a headrail, a plurality of ladder tapes suspended from said headrail, a plurality of blind slats supported by said ladder tapes, and raise cord means passing through openings in said blind slats, whereby said blind slats may be drawn upwardly toward said headrail, and said apparatus comprising, die support means defining an elongated pathway along a predetermined axis for passage of at least two strips of strip material therealong for the formation of said blind slats, a plurality of die means mounted on said die support means, at least some of said die means being moveable therealong, said die means being aligned with one another along said pathway whereby said strips of said material may pass therealong side by side, at least two punch dies associated with each of said die means in spaced apart relation for receiving respective said strips therethrough, die operating means operable to procure selective operation of said die means, and, control means for selecting certain of said punch dies to be operated thereby whereby to form openings in a selected one of said strips of said strip material at pre-selected spaced points therealong.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 1 in perspective illustration of a blind forming apparatus in accordance with the invention;

DESCRIPTION OF A SPECIFIC EMBODIMENT

Figures 1, 1A:
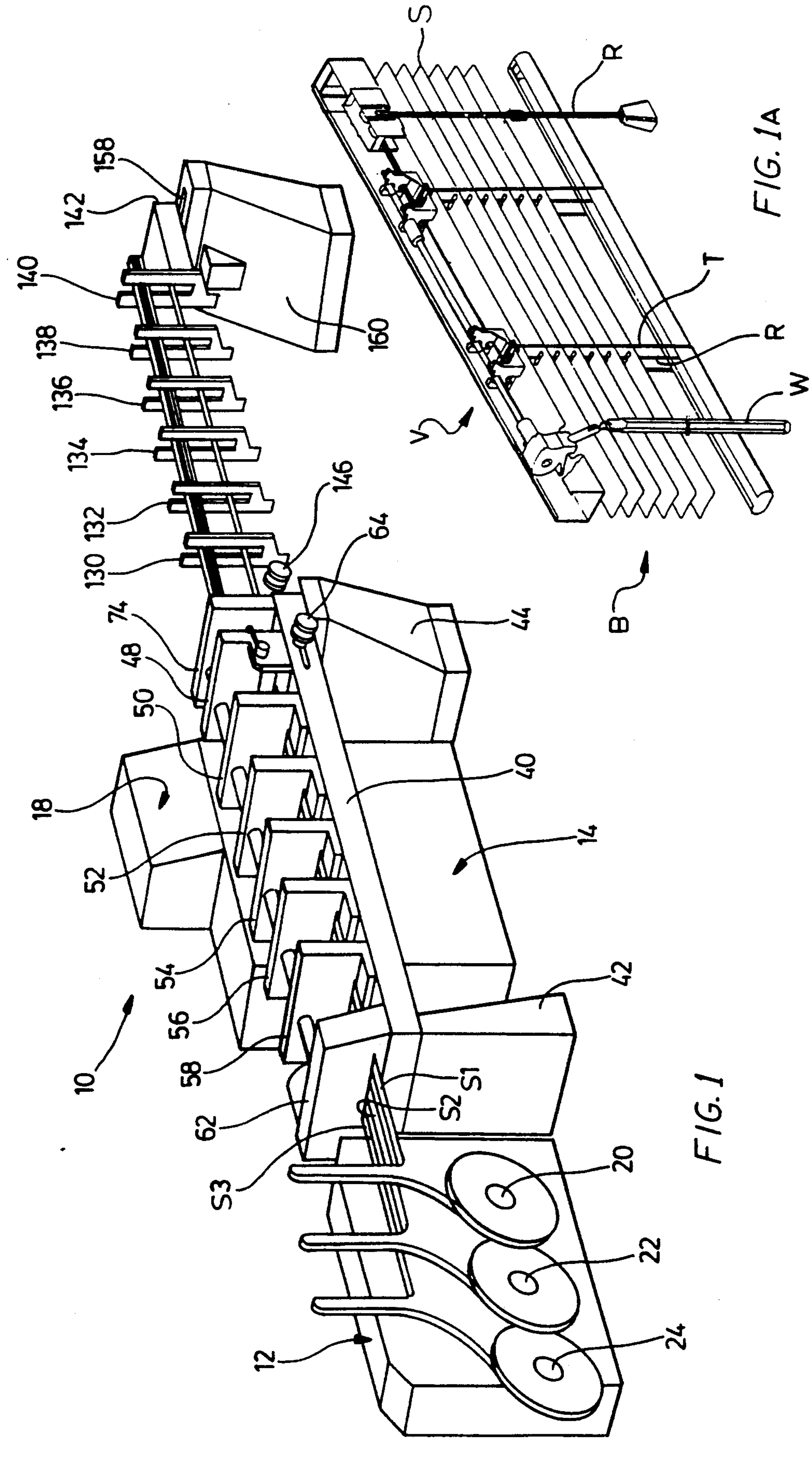
FIG. 1A is a perspective illustration of a typical venetian blind of the type manufactured on apparatus in accordance with the invention.

Referring first of all to FIG. 1, it will be seen that this illustrates in general a machine for the manufacture and assembly of blind slats into venetian blinds. The general features of such venetian blinds are well known, and have already been generally outlined herein, and are therefore omitted from this description for the sake of clarity.

FIG. 1A shows a typical venetian blind B of the type made on the apparatus of FIG. 1. It has a headrail V, a set of slats S hanging from the headrail V by means of tapes T, cords R for raising and lowering the blind B, and a control wand W for controlling the angle of the set of slats S.

The machine, indicated generally as 10, in accordance with the invention, as illustrated in FIG. 1 in this embodiment, will be seen to comprise four general areas or sub-assemblies namely a strip feed and roll forming assembly 12, a hole-punching and cut-off section 14, a tape threading section 16, and a control console 18. These various sub-assemblies or portions of the overall apparatus will now be described separately.

Strip Feed and Roll-forming Assembly

The strip feeding and roll-forming assembly 12 comprises, in this embodiment, three separate roll-mounting bosses 20, 22, and 24, the axes of which are spaced apart longitudinally along the length of the assembly as shown. In addition, transverse vertical planes intersecting the axes of the bosses are spaced apart from one another horizontally. The coils of strip sheet metal are adapted to be mounted on the bosses as indicated at C.

Each of the coils will thus be seen to define a strip axis which is offset with respect to the other two strip axes, but with all three parallel to one another.

In this way, up to a maximum, in this embodiment, of three separate coils of strip may be mounted on the strip-feeding assembly, and since the axes of the bosses are offset longitudinally, the coils of strip sheet metal on the respective bosses may be interchanged and replaced selectively, without interfering with the positioning of the others, if this is desired.

Each of the bosses 20, 22, and 24 is, in turn, associated with a large plurality of rolls illustrated generally as 26, for first of all feeding the strip from the respective coil C, and secondly roll-forming the strip into the generally arcuate section desired for blind slats.

The details of such feed rolls and roll-forming rolls are omitted for the sake of clarity, but it will be observed that as will appear as this description proceeds, each of them may be separately controlled by means of braking and clutch mechanisms in a manner known per se, not described herein in detail so that each one of them may be fed through the roll-forming rolls, and fed into the punching stations 14 and threading stations 16, selectively, for purposes to be described below.

Each of the bosses 20, 22, and 24 is also associated with a respective strip length measuring control 28, 30, and 32 respectively. Each of the strip measuring controls is of a type generally well known in the art and provides a so-called free loop of strip material. Thus, each of the length controls comprises an elongated channel-shaped enclosure 34, having suitable sensing means 36 (i.e., photo-sensing means) at its upper end. The sensing means 36 is adapted to sense the presence of the top portion of a loop of strip material within the channel 34, and thus send a length signal to the control console 18.

In this way, as will be described below, the operation of the feed rolls and roll-forming rolls associated with each of the bosses 20, 22, and 24, may be controlled, to feed strip material in the length required.

Punching and Cut-off Assembly

The punching and cut-off assembly indicated generally as 14 will be seen to comprise an elongated hollow bench portion 40, and two end support columns 42 and 44, upon which the bench 40 is supported.

Bench 40 has on its upper surface a pair of spaced-apart rails 46—46. A plurality of moveable punching stations 48, 50, 52, 54, 56, and 58, are slideably mounted for longitudinal movement along bench 40, on the rails 46—46. While in this embodiment of the invention six such punching stations 48 to 58 are shown, it will be appreciated that there may be a greater or lesser number depending upon the requirements of a particular manufacturer.

The details of the punching stations will be described later. However, each punching station is adapted to receive each of the three strips S1, S2, and S3 coming from the three coils C, in side-by-side parallel spaced-apart relation. The punching stations are operated by means of a common longitudinal drive shaft 60 operated by means of a suitable motor and clutch combination 62.

The far end or first punching station 48 (which is remote from the roll-forming assembly 12) is moveably adjustable along bench 40, by means of a hand wheel 64 and is lockable by means of a locking wheel 66.

Figure 9:
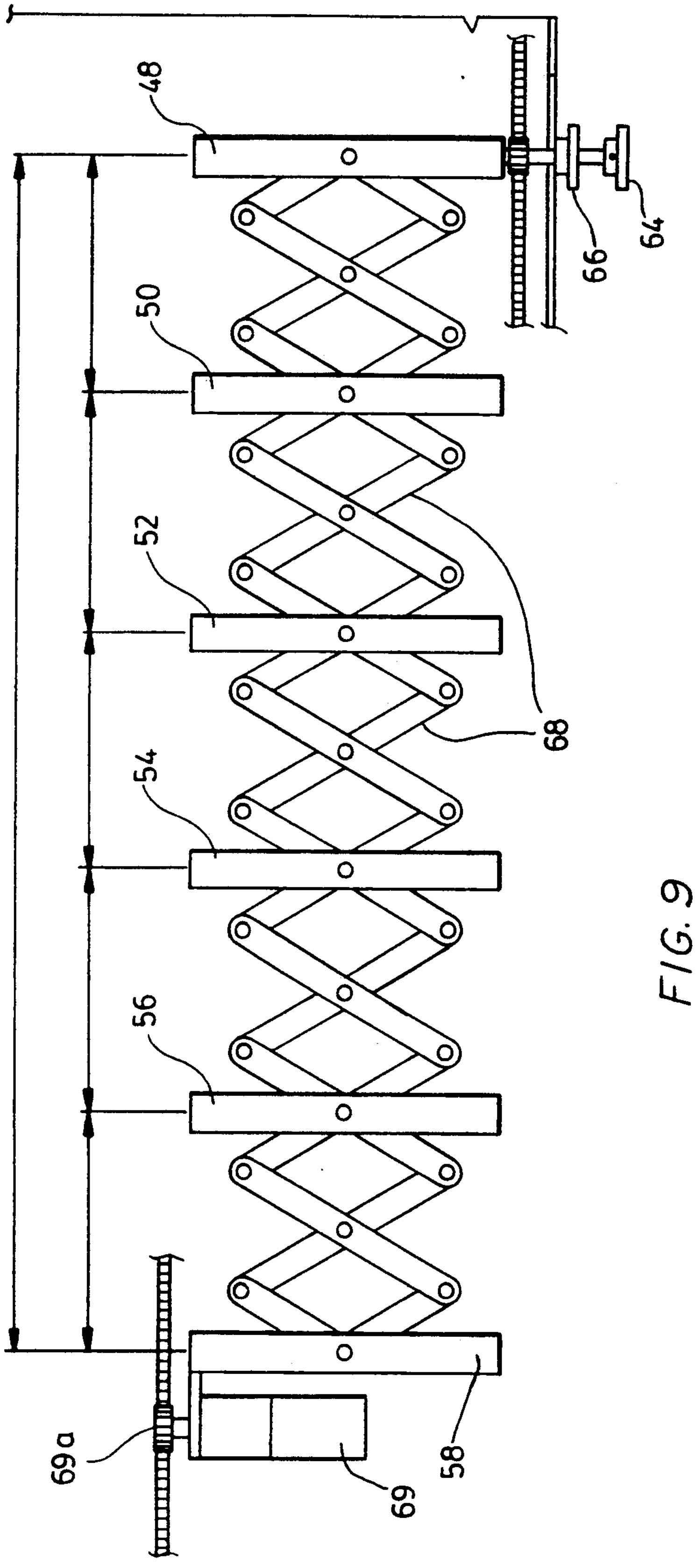
FIG. 9 is a top plan view showing the interconnection of the movable die means with the end die means.

As best shown in FIG. 9, the punching stations 48 through 58 are moveably joined together by means of a scissors or "lazy tongs" type zig-zag linkage indicated as 68.

Figure 7:
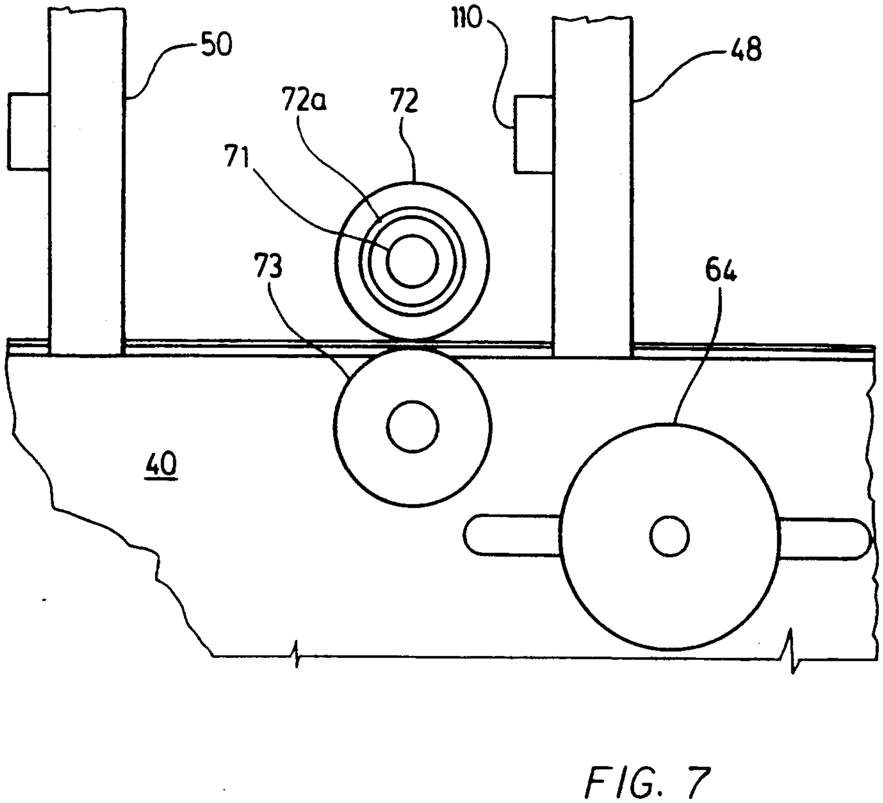
FIG. 7 is a side elevation of a die means and a strip control means.
Figure 12:
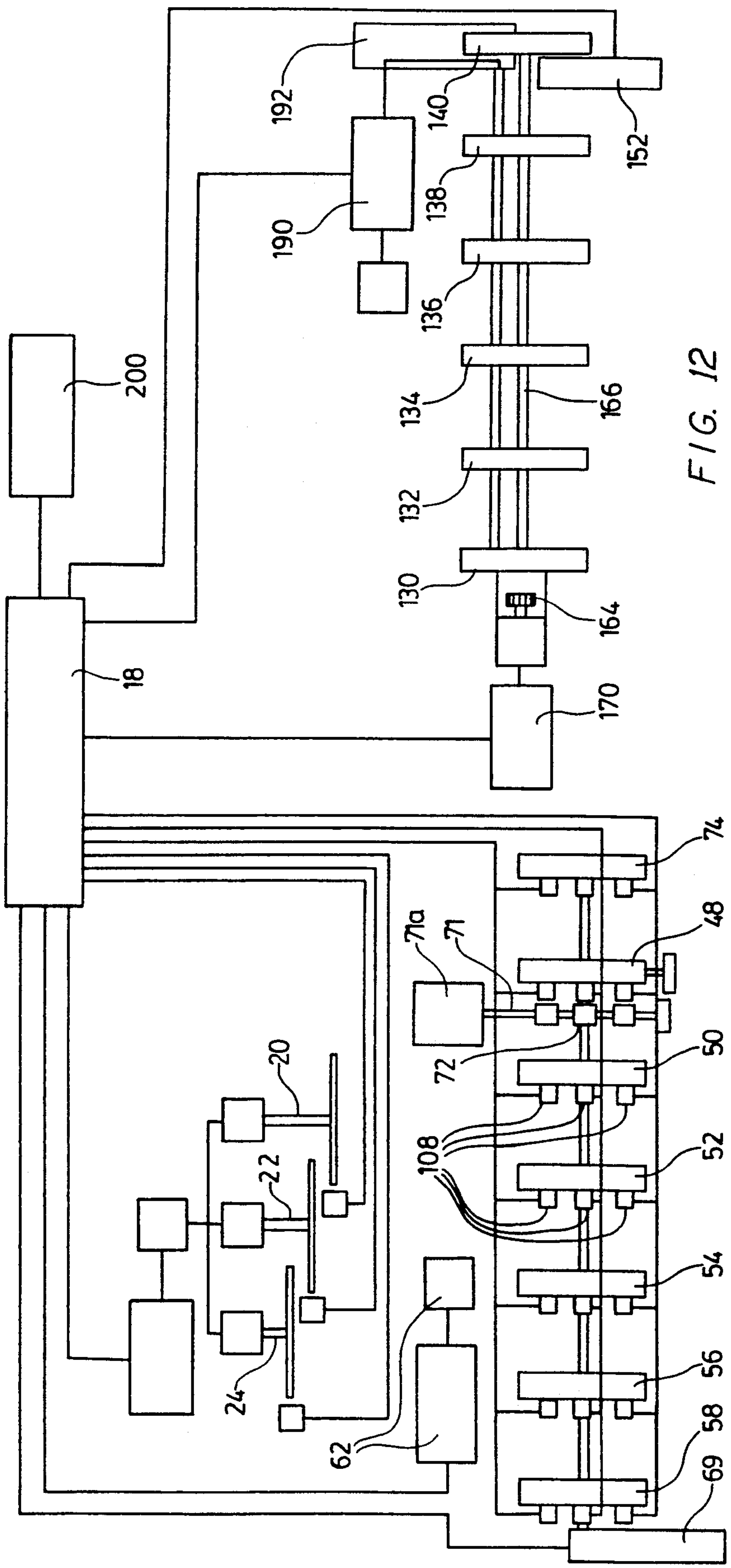
FIG. 12 is a schematic block diagram of the basic controls of the apparatus.

The near end punching station 58, which is closest to the roll-forming assembly 12, and the linkage 68 are movebly positionable by means of an electrical motor drive 69 and rack and pinion **69*a*. The motor drive 69 and the scissors linkage 68 are concealed within the interior of the hollow bench 40, and a cover plate 70 (FIG. 2) is moveably positioned thereover, to prevent contamination with debris or other material from the workplace. In order to provide a positive drive on the strips S1, S2, S3, drive shaft 71 and motor 71*a* are provided, driving feed rollers 72—72—72, through respective clutches 72*a* formed integrally with rollers 72 (FIGS. 7, and 12**).

It will be understood that since the punching stations 48 through 58 are all linked together, by the zig-zag scissors linkage 68, movement of the near end, or "upstream" punching station 58, will move all of the linked moveable punching stations 50, 52, 54 and 56, in unison, while the reference station 48 remains in position.

The distance moved by station 58 will be greatest, and the distance moved by each of the stations 56, 54, 52, and 50 will be progressively decreased.

It will be understood as is well known that in this kind of scissors or lazy-tongs zig-zag linkage, each of the movable punching stations will move in increments equal to the next upstream punching station, less the proportional increment resulting from its connection thereto by the scissors linkage.

It will of course be appreciated that the downstream or far end punching station 48 is fixed by means of the handwheel 64 and locking wheel 66 and therefore constitutes a fixed or reference point, which is immoveable.

Thus once the punching station 48 has been preset to its desired fixed position, it thereafter remains stationary, while all of the other punching stations 50 through 58 are movable by means of the electrical motor drive 69.

The blind slats are themselves severed or cut from the strip S1, S2, and S3, as the case may be, at a cut-off station 74, which is fixed in position at the downstream end of the bench 40.

Suitable punch drives and cut-off drives yet to be described in the punching stations and cut-off station 74 are operated by the shaft 60.

It will thus be appreciated that the rotation of the shaft 60 will procure both the punching of suitable holes in one of the strips S1, S2, or S3, and also cutting off at the end of one of the strips S1, S2, and S3, of a blind slat which has already been formed, in a manner described below.

Figure 4:
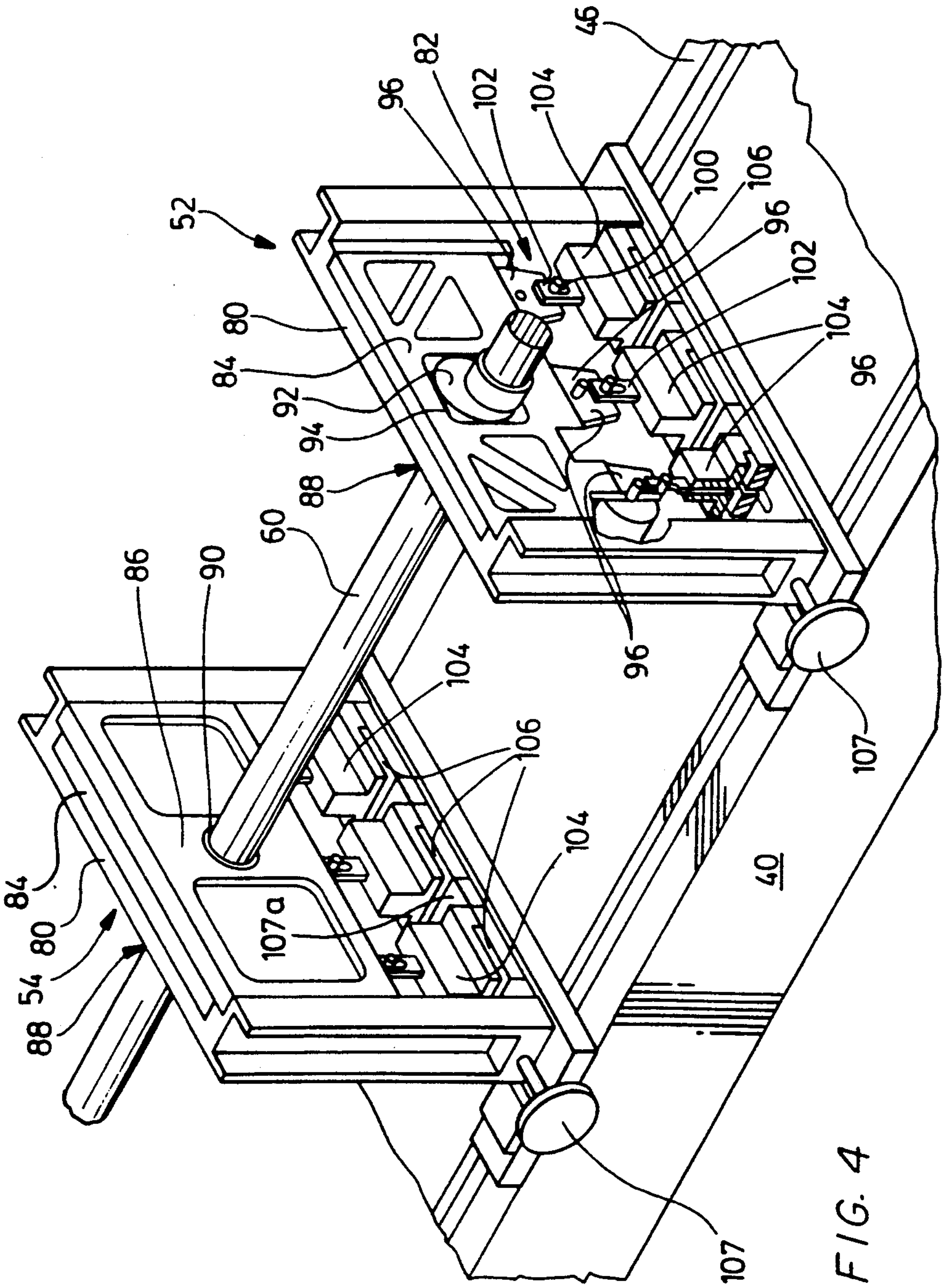
FIG. 4 is an enlarged perspective illustration of a portion of the die support portion of the apparatus of FIG. 1.

Referring now to FIG. 4, each of the punching stations 48 to 58 is adapted to punch an opening in any one of the three strips S1 or S2 or S3 selectively, upon the operation of the common longitudinal drive shaft 60. Shaft 60 also operates cut off die station 74.

This is achieved in the manner described below:

Each of the stations 48 to 58 and 74 comprises a generally unitary integral bridge member 80 defining on one side an interior recess 82.

Within recess 82, a sliding plate 84 is received, being slidable upwardly and downwardly, while being restrained from sideways movement. Plate 84 is retained in position by face plate 86.

Shaft 30 is journalled in bridge 80 as at 88, and in plate 86 as at 90. A cam member 92 is fastened to shaft 60, and registers with movable or sliding plate 84.

A generally rectangular cam receiving opening 94 is formed in sliding plate 84. Rotation of the shaft 60 will thus cause rotation of cam 92, which will thus cause downward and upward movement of plate 84.

Extending downwardly from plate 84, are three plate extension members 96—96—96 which are spaced apart from one another, and depend downwardly on parallel axes. Each of the extension members 96 is formed with a pin 98 extending therefrom at right angles. Each of pins 98 are in turn received in respective slotted recesses 100, formed in respective die bar members 102. Die bar members 102 extend downwardly through die blocks 104, and are connected to suitable punching dies (not shown), in the case of the punching stations 48 through 58, or to suitable cutoff dies (not shown) in the case of the cutoff station 74, for purposes to be described below. The punching and cutoff dies are themselves omitted and are not specifically illustrated since they are well known in the art and require no special description. They simply reciprocate up and down and either punch holes for the raise cords, or cut off the blind slats from the ends of the strips, as the case may be. The die blocks 104 are formed with generally flattened slotted passageways 106 extending there through, for receiving the metal strips S1, S2 and S3 respectively.

The die blocks 104 are retained in position by the hand locking screw 107. In this way, the die blocks 104 may readily be removed and replaced or substituted to accomodate strip material S of different widths, as may be required for the manufacturing of blinds having slats of different widths from time to time.

Die clamping bars 107*a* are loosely secured between adjacent die blocks 104, and enable the clamping of all three die blocks 104 by a single clamping screw 107 in each of the punching stations (FIG. 4).

As has already been explained above, the punch dies and cutoff dies are operable selectively. That is to say they may be selected either with a respect to either of strips S1, S2 or S3, or as to any one or more of the punching stations 48 through 58, as well as the cutoff station 74.

Since there are six punching stations and one cutoff station, and three dies in each station it will be seen that there are in fact twenty-one separate dies to be controlled and operated selectively.

This is achieved in accordance with invention by means of movable die locking bosses 108, mounted in extension members 96. Bosses 108 register with the upper ends of the tongues 102. The bosses 108 are connected to respective solenoids 110. The solenoids 110 are in turn connected to the control console 18. By suitable logic controls within the console 18, any combination of the solenoids 110 may be selected for operation.

Figure 5:
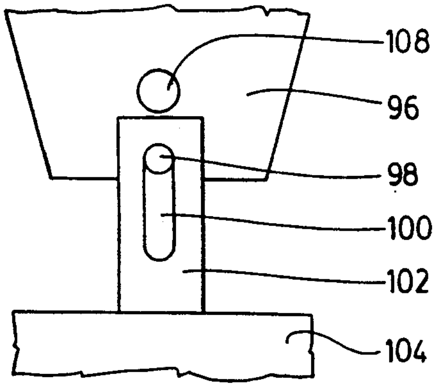
FIG. 5 is an enlarged front elevation of the die operating means, with portions thereof cut away.
Figure 6:
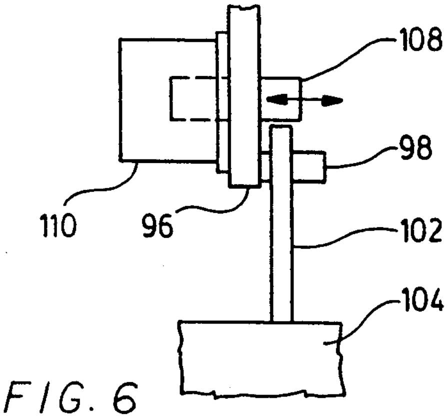
FIG. 6 is a side elevation of the die operating means of FIG. 5.

It will be appreciated that as mentioned above each of the solenoids 110 are separately and individually controllable and operable by means of the console 18. The operation of any one of the solenoids 110 will cause its respective boss 108 (FIGS. 5 and 6) to be extended outwardly from its respective extension member 96. It will thus register with and overlie the upper end of its respective tongue member 102.

When the boss is in this position, the operation of the plate member 84 within the die station, in which its extension member 96 is located, will cause operation of the die connected to the tongue member 102, while leaving the other dies in that station unaffected and, therefore, inoperable.

In this way, individual ones of the dies in each station can be individually selected and operated, by means of the control console 18, and the common drive shaft 60, which operates all of the punching stations, and also the cut-off station, simultaneously.

The Threader Assemblies

The threader assembly 16 functions to assemble the individual blind slats on their respective ladder tapes.

In order to do this, the threader assembly 16 has a plurality of threader stations 130, 132, 134, 136, 138 and 140. The threader stations 130 to 140 are supported on a movable generally horizontal bench portion 142. Bench portion 142 is hollow in much the same way as bench portion 40 of the punching assembly 14.

The threader stations are slidably movable along the bench 142, on rails 144—144.

The nearmost upstream station 130, is provided with a manual adjustment knob 146 and a locking wheel 148.

Figure 11:
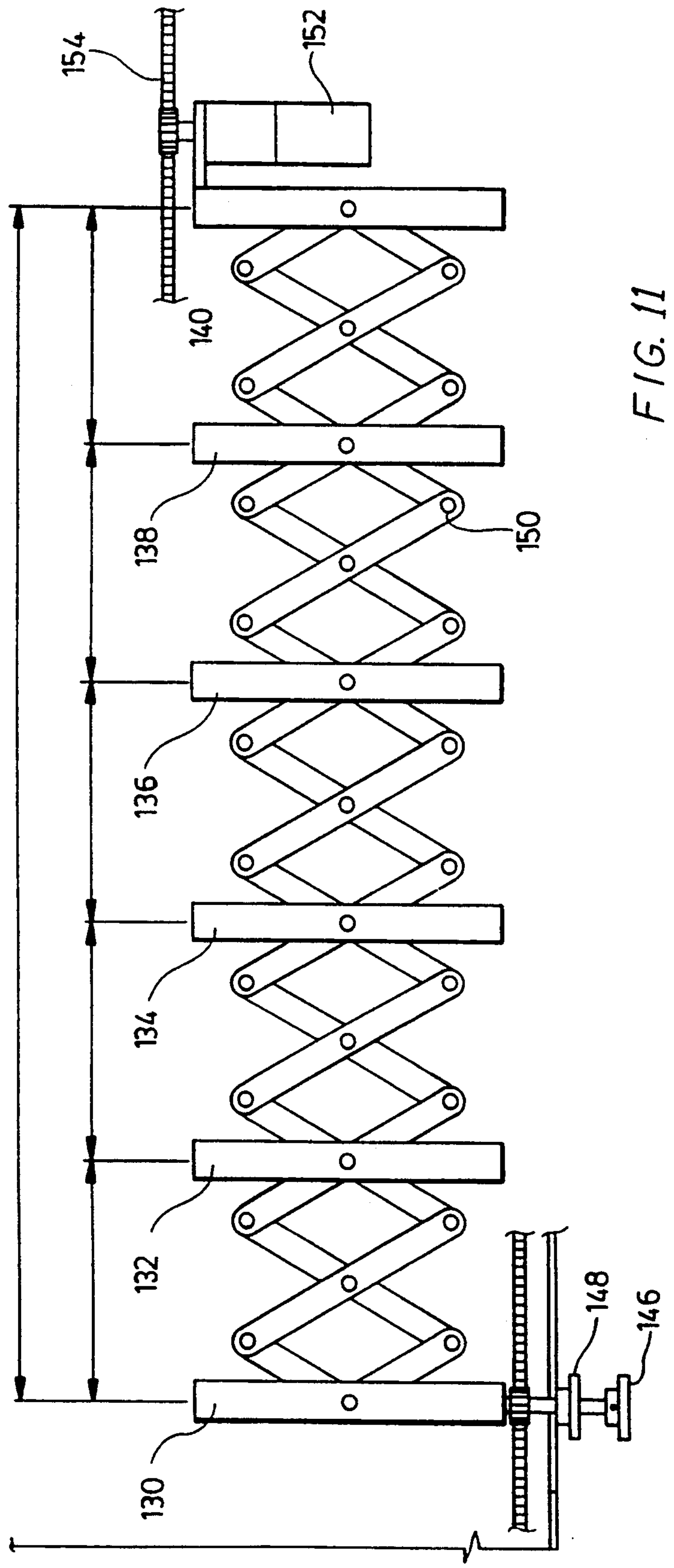
FIG. 11 is a top plan view of the interconnection between respective threader means.

The threading stations 130 to 140 respectively are connected together by a scissors or a lazy tongs type linkage 150 (FIG. 11). The linkage 150 is similar to the linkage 68 connecting the punch die stations 48 through 58 (FIG. 9).

In the case of the threading stations, the first or upstream threading station 130 is manually adjustable as by hand wheel 146 and may be fixed by locking wheel 148 to provide a reference point.

The endmost or downstream threading station 140 is movable by means of a motor 152 and rack and pinion 154.

In this way, the downstream endmost threading station 140 can be moved by the motor, and the other threading stations 138, 136, 134 and 132 will move in unison, but in varying increments. Threading station 130 will of course remain fixed and immovable, once it has been pre-set by means of the hand wheel and establishes a reference point for the operation of the linkage 150.

Figure 2:
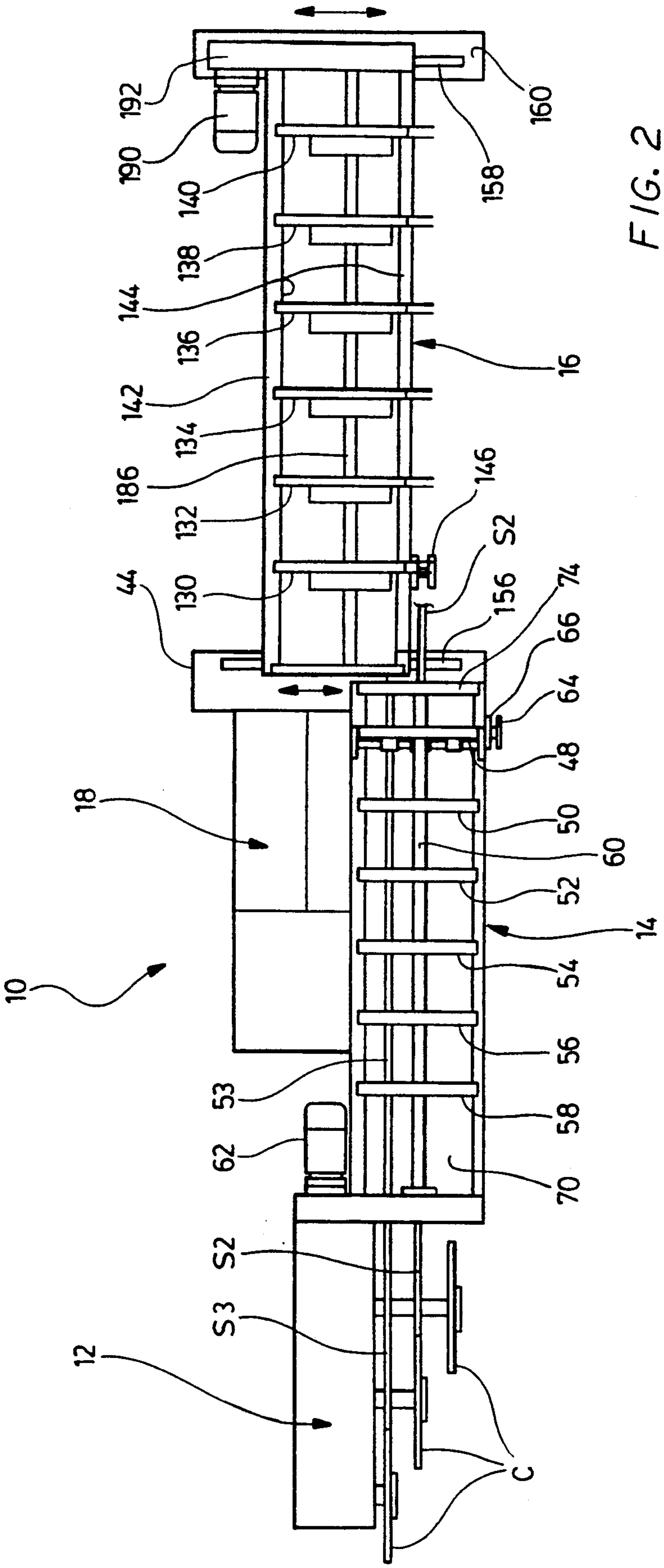
FIG. 2 is top plan view of the apparatus shown in FIG. 1.
Figure 3:
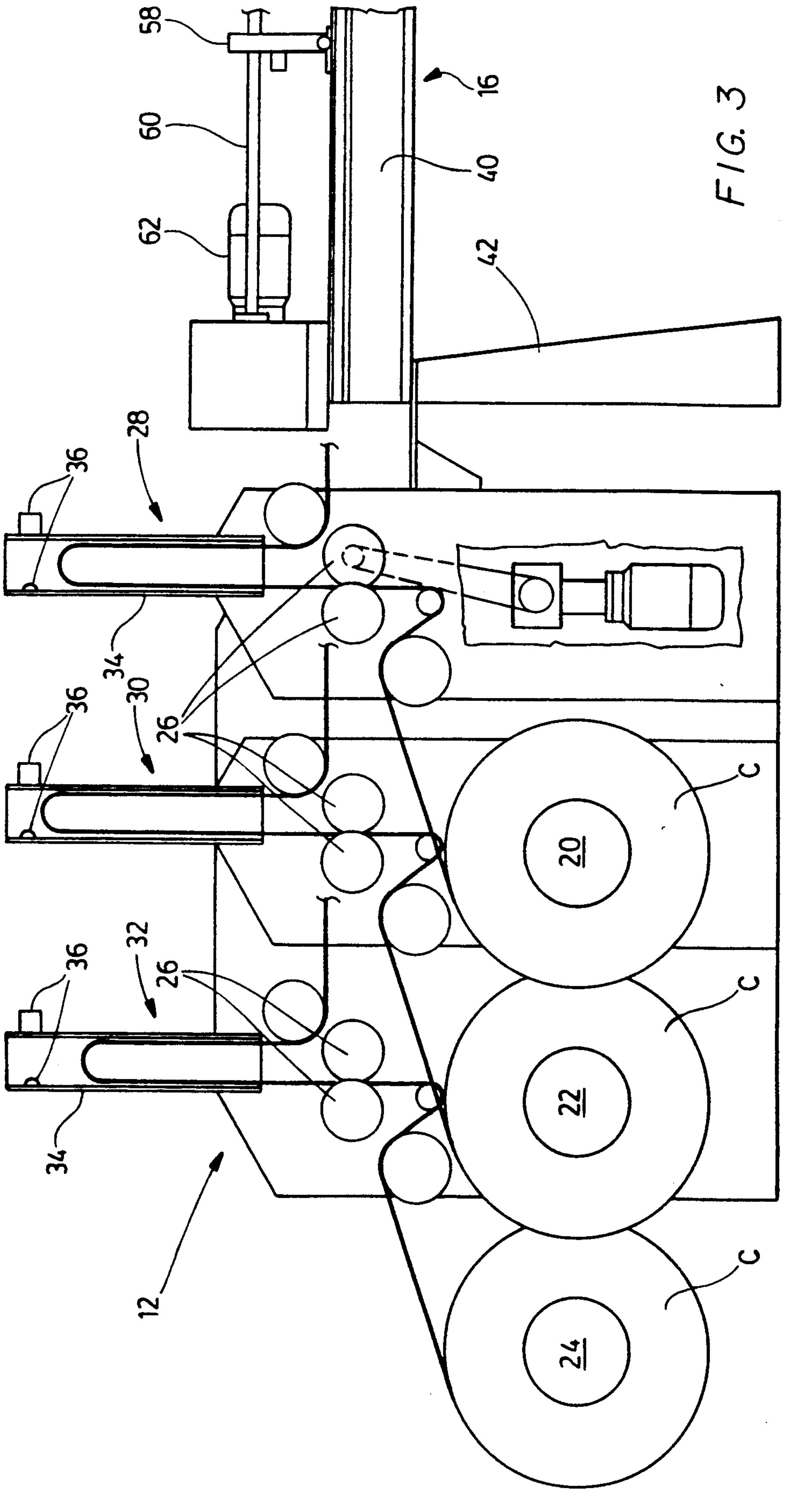
FIG. 3 is an enlarged side elevation of the strip feed and roll forming portion of the apparatus of FIG. 1.
Figure 8:
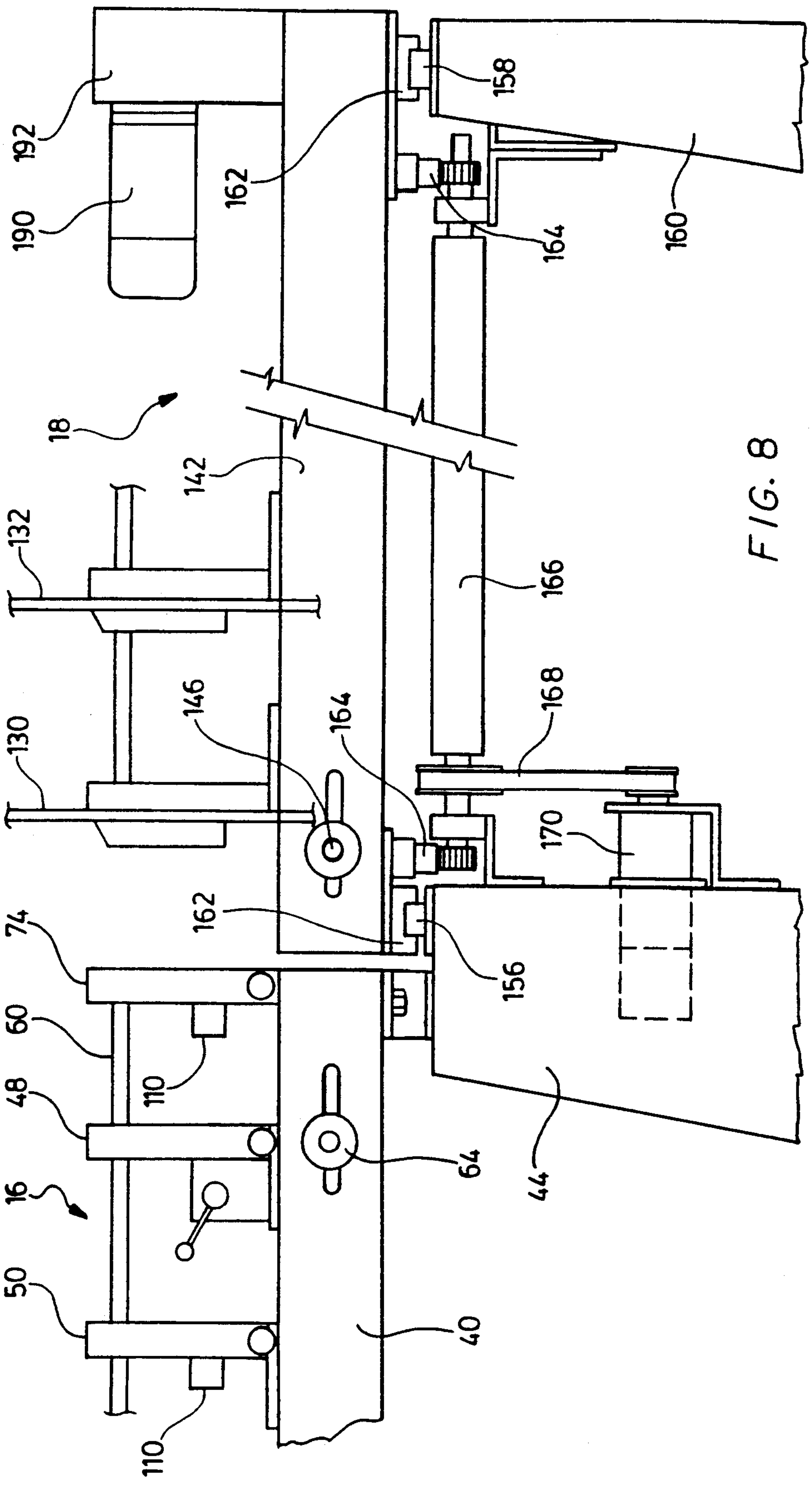
FIG. 8 is a side elevation of a trailing end portion of the die means and a leading end portion of the threader means.

In addition to this longitudinal movement, the threading stations 130 to 134 are, as mentioned, mounted on a longitudinal threader support or bench 142. As shown in FIGS. 2 and 8, the longitudinal bench 142 is itself laterally movable. For this purpose, it is mounted on a first end rail 156, supported on the top of leg 44, and a second end rail 158 supported on the top of a leg 160. Sliding guide members 162—162 are located on the under side of the bench 142 and engage rails 156 and 158. In this way the bench 142 may be slid laterally, relative to the longitudinal axis of the bench 142, and also relative to longitudinal axis of the bench 140 and strips S1, S2 and S3.

Lateral movement of the bench 142 is achieved as shown in FIG. 8, by means of a rack and pinion drive 164—164, at each end of bench 142 operated by a common drive shaft 166. Drive shaft 166 is driven for example by belt 168 and motor 170. In this way, the bench 142 can be traversed laterally from side to side so as to align with any one of the strips S1, S2 and S3 as desired.

Figure 10:
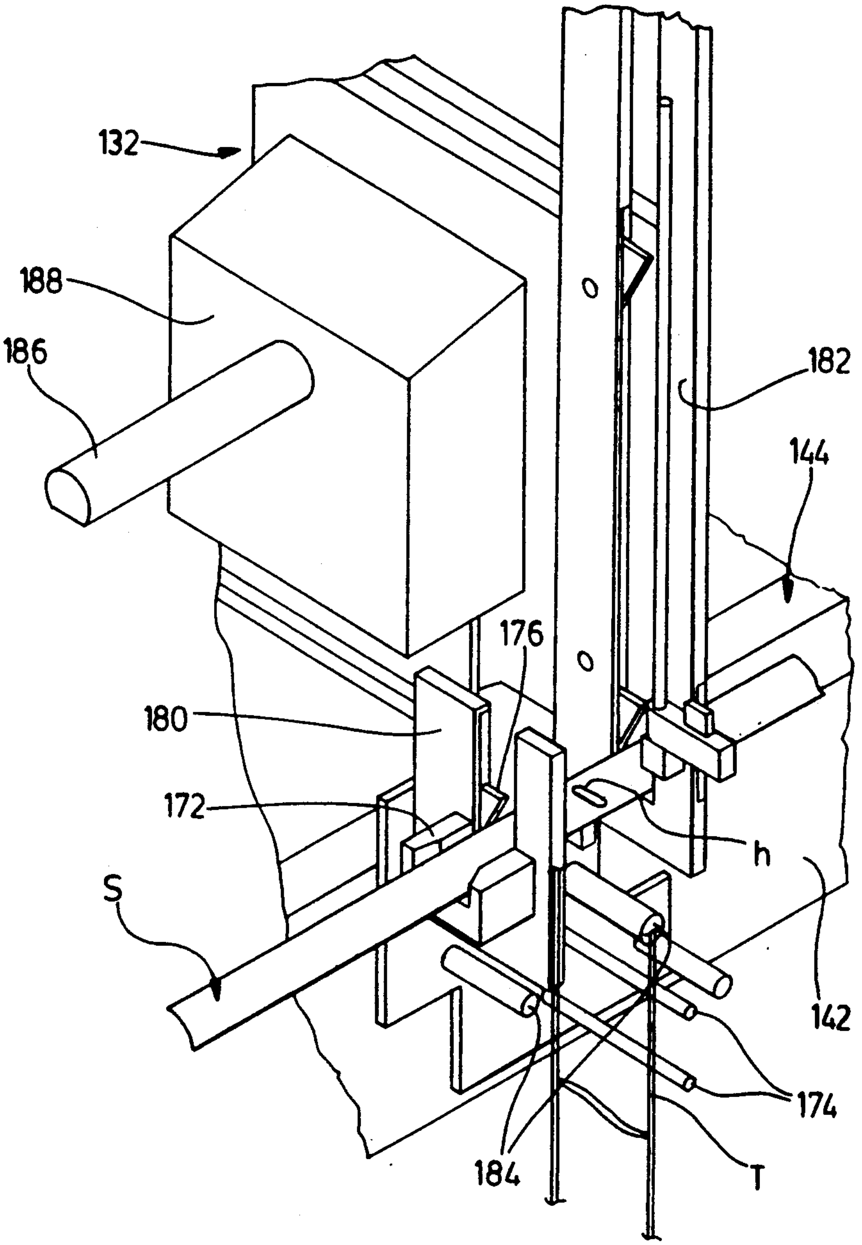
FIG. 10 is an enlarged perspective illustration of the threader means for threading the blind slats through the ladder tapes.

The operation of the threading stations themselves in this embodiment of the invention is much the same as the operation of threading stations in earlier forms of blind forming machines. As best shown in FIG. 10 a threader station, in this case indicated as 132 will be seen to comprise a guide shoe 172, adapted to receive one of the strips indicated generally as S. The ladder tapes or cords indicated generally as T, extend upwardly past feed fingers 174.

Releaseable blade supporting clips 176 and 178 are supported on spaced apart generally U-shaped channel guide members 180 and 182.

Once a slat has been threaded to make way for the next slot, it is then moved upwardly.

The clips 176 and 178 are mounted resiliently, and are adapted to allow a strip S to be raised upwardly. Raise fingers 184 are provided for engaging the slat and raising it upwardly once it has been threaded into its respective tapes T.

The raise fingers 184 are driven by a suitable common drive shaft 186 extending through all of the threader stations 130 to 140. The drive housing 188 contains a suitable drive mechanism (not shown) whereby the raise fingers 184 may be operated.

In addition, as was common in earlier such blind making machines, an escapement mechanism (not shown) is provided for gradually and progressively releasing the tapes T from storage locations (not shown) below each threader station upwardly as each slat is moved upwardly by the raise fingers.

The U-shape guides 182 will seen to be longer than the guides 180. This permits a large number of blind slats S to be supported one above the other, so as to permit the assembly of a blind of considerable size for the large number of slats.

It will of course be appreciated that once the necessary number of slats have been assembled, the tapes are cut by the operator, and the stack of blind slats in their tapes, is then removed. The stack is then taken to another location (not shown) where the raise cords are threaded through the holes h, and where the head rails, and bottom rails (FIG. 7A) of the blinds are attached.

The common drive shaft 186 for all of the threader stations is driven by means of any suitable electrical motor drive such as motor 190, and drive 192 (FIG. 2).

The console 18 will be a typical computer, operating a variety of control relays (not shown) such as are well know in the art, for controlling the various motors, brakes, clutches and the like, and of course the solenoids 108. A general schematic diagram is shown in FIG. 12. A typical keyboard 200, will be connected to the console 18 for inputting appropriate commands.

In operation, strips S1, S2 and S3 may be supplied either in three different widths of strip material, or in three different colors of material of the same width.

A blind may then be made up of a single color in a predetermined width, or made with up to a combination of three colors in a predetermined width.

In the event that a blind is made up for example of three colors, then, for example, the threader assembly 16, and its bench 142, will be aligned with for example the first strip S1, by operation of the motor 170.

The length of the blind slats required in the eventual blind will have been inputted through the keyboard 200. The spacing between the end of the blind slat and the first raise cord hole h to be punched in the blind slat will have been preset manually by presetting the endmost punch station 48 by means of the hand wheel 64.

The computer console 18 will then operate motor 70, to cause the station 58 to move to a predetermined position. It may be that the blind slat will be punched with only two raise cord holes, or three or four or more raise cord holes may be punched, depending upon the length of the blind.

The computer is such that in the event that only two holes are required, the first hole will be punched by the fixed endmost punch station 48. The second raise cord hole will then be punched by any one of the punch stations 50 through 58, as selected and determined by the computer.

Similar adjustments will have been made manually to the first threader station 130 by means of the hand wheel 146. The motor 152 will then move the downstream threader station 140 to its appropriate position, thereby moving all other moveable stations 132–138, in varying amounts.

The strip feed and roll forming assembly 12 is then operated so as to uncoil strip S1 from boss 20 and feed it through its sequence of rolls 26 so as to feed it in the appropriate length and also to roll form it to a desired shape in a manner known per se.

The roll formed strip S1 will then pass down through the die stations 58 through 74 in sequence. When it reaches the die station 74, the motor 62 is operated by the computer and at the same time, the appropriate solenoids 108 are also operated. This will then cause the end portion of the blind slat to be cut as at the cut off station 74 and also to be punched at the punch station 48 and a preselected one of the remaining punch stations 50 through 58. Obviously, if more than two holes are to be punched, then the computer will operate solenoids at all of the appropriate punch stations to produce punching of all holes simultaneously.

After punching and cutting has been completed, by a single revolution of the shaft 60, the strip feed mechanism will then move strip S1 a predetermined distance, causing it to advance into the threader stations 130 through 138. That portion of the strip forming the blind slat, will then, in this process be threaded into its respective two or more ladder tapes T, when the appropriate length has passed the station 74.

The foregoing is a description of a preferred embodiment of the invention which is given here by way of example only. The invention which is not to be taken as limited to any of the specific features as described, but comprehends all such variations thereof as come within the scope of the appended claims.

What is claimed is:

1. Apparatus for the manufacture of blinds of the type having a headrail, a plurality of ladder tapes suspended from said headrail, a plurality of blind slats supported by said ladder tapes, and raise cord means passing through openings in said blind slats, whereby said blind slats may be drawn upwardly toward said headrail, and said apparatus comprising;

die support means defining a predetermined axis for passage of strip material therealong for the formation of said blind slats;

a plurality of die means mounted on said die support means, at least some of said die means being moveable therealong, said die means being aligned with one another along said strip axis whereby a said strip of said material may pass therealong;

scissors linkage means interconnecting said moveable die means, whereby movement of one of said moveable die means is communicated to all of the remaining said connected moveable die means such that each of said moveable die means moves a distance different than that moved by its adjacent said moveable die means, whereby at least selected ones of said moveable die means may be precisely positioned along said support means;

die movement means for moving said one of said moveable die means;

die operating means operable to procure selective simultaneous operation of selected ones of said die means while leaving others of said die means inactive;

die control means for selecting those said die means to be operated whereby to simultaneously form openings in said strip material at pre-selected spaced points therealong by simultaneous operation only of those said die means selected by said die control means;

cut off die means for cutting off a pre-selected length of said strip material to form a said slat for a said blind, and, slat threader means, located downstream of said die support means, for supporting said ladder tapes and defining a pre-determined slat threading path for threading a said slat through said ladder tapes.

2. Apparatus as claimed in claim 1 wherein all of said die means are operable by a single common power operated means, and wherein said die control means is operable for selectively operating individual ones of said die means, through common power operated means.

3. Apparatus for the manufacture of blinds of the type having a headrail, a plurality of ladder tapes suspended from said headrail, a plurality of blind slats supported by said ladder tapes, and raise cord means passing through openings in said blind slats, whereby said blind slats may be drawn upwardly toward said headrail, and said apparatus comprising;

at least two strip material supply means;

die support means defining an elongated pathway along a predetermined axis for passage of said at least two strips of strip material therealong for the formation of said blind slats from one or other of said at least two strips;

a plurality of die means mounted on said die support means, at least some of said die means being moveable therealong, said die means being aligned with one another along said pathway whereby said strips of said material may pass therealong side by side;

at least two punch dies associated with each of said die means mounted in side by side spaced apart relation for receiving respective said strips therethrough;

scissors linkage means interconnecting said die means, whereby movement of one of said moveable die means is communicated to all of the remaining said connected moveable die means such that each of said moveable die means moves a distance different from its adjacent said moveable die means, whereby at least selected ones of said moveable die means may be precisely positioned along said support means;

die movement means for moving said one of said moveable die means;

die operating means operable to procure simultaneous operation of selected ones of said die means, and, die control means for selecting certain of said at least two punch dies to be simultaneously operated thereby while leaving other of said punch dies inactive whereby to form simultaneous openings in a selected one of said at least two strips of said strip material at pre-selected spaced points therealong.

4. Apparatus as claimed in claim 3 including cut off die means for cutting off a pre-selected length of a selected one of said strips of said strip material to form a said slat for a said blind.

5. Apparatus as claimed in claim 4 including slat threader support means, located downstream of said die support means, for supporting said ladder tapes and defining a pre-determined slat threading path for threading a said slat through said ladder tapes.

6. Apparatus as claimed in claim 3 wherein all of said die means are operable by a single common power operated means, and wherein said die control means is operable for selectively operating individual ones of said die means, through common operating means.

7. Apparatus as claimed in claim 5 and including moveable mounting means connected to and supporting said threader means, and power operated movement means connected to said threader means, whereby said threader means may be moved with said mounting means between at least two predetermined positions relative to said axes of said at least two strip axes.

8. Apparatus as claimed in claim 1 and including moveable mounting means connected to and supporting said threader means, and power operated movement means connected to said threader means, whereby said threader means may be moved with said mounting means between at least two predetermined positions relative to said strip axis.

9. Apparatus for the manufacture of blinds of the type having a headrail, a plurality of ladder tapes suspended from said headrail, a plurality of blind slats supported by said ladder tapes, and raise cord means passing through openings in said blind slats, whereby said blind slats may be drawn upwardly toward said headrail, and said apparatus comprising;

die support means defining at least one predetermined axis for passage of strip material therealong for the formation of said blind slats;

a plurality of die means mounted on said die support means, said die means being aligned with one another along said at least one strip axis whereby a said strip of said material may pass therealong;

die operating means operable to procure operation of said die means, whereby to form openings in said strip material at pre-selected spaced points therealong;

slat threader means, located downstream of said die support means, for supporting said ladder tapes and defining a pre-determined slat threading path for threading a said slat through said ladder tapes;

moveable mounting means supporting said threader means, and power operated movement means connected to said threader means, whereby said threader means may be moved on said mounting means between at least two predetermined positions relative to said at least one predetermined axis of said die support means.

10. Apparatus as claimed in claim 9 wherein there are a plurality of said die means, and at least some of said die means being moveable relative to others of said die means and including linkage means interconnecting said moveable die means, whereby movement of one of said moveable die means is communicated to all of the remaining said connected moveable die means, and, die movement means for moving said linkage means.

11. Apparatus as claimed in claim 10 wherein said linkage means causes each of said moveable die means to move a distance different than that moved by its adjacent said moveable die means, whereby at least selected ones of said moveable die means mat be precisely positioned along said support means, and thereby form openings in said strip material in desired locations.

12. Apparatus as claimed in claim 11 wherein all of said die means are operable by a single common power operated means, and wherein said die control means is operable for selectively operating individual ones of said die means, through said common power operated means.

13. Apparatus for the manufacture of blinds of the type having a headrail, a plurality of ladder tapes suspended from said headrail, a plurality of blind slats supported by said ladder tapes, and raise cord means passing through openings in said blind slats, whereby said blind slats may be drawn upwardly toward said headrail, and said apparatus comprising;

at least two blind slat material supply means adapted to supply at least two strips of blind slat material along parallel spaced apart blind slat paths;

die support means defining at least two elongated pathways along at least two predetermined axes for passage of said at least two strips of slat material therealong parallel to one another for the formation of said blind slats from one or other of said at least two strips;

a plurality of die means mounted on said die support means in at least two groups on respective said paths at least some of said die means being moveable therealong, said die means in each said group being aligned with one another along respective said pathways for receiving respective said strips of said material side by side in spaced apart relation;

die operating means operable to procure simultaneous operation of selected ones of said die means in respective said groups;

strip threader means, located downstream of said die support means, for supporting said ladder tapes and defining a predetermined treading path for threading a said strip through said ladder tapes;

moveable mounting means supporting said threader means whereby said threader means may be aligned with a selected one of said strip paths, and, power operated movement means connected to said threader means, whereby said threader means may be moved on aid mounting means between at least two predetermined positions.

14. Apparatus as claimed in claim 13 wherein there are three said blind strip material support means supplying three said strips of blind slat material along parallel spaced apart paths, and wherein there are three groups of said die means defining three said paths.

15. Apparatus as claimed in claim 14 wherein said threader means is moveable between said three paths.

16. Apparatus for the manufacture of blinds of the type having a headrail, a plurality of blind slats supported by said ladder tapes, and raise cord means passing through openings in said blind slats, whereby said blind slats may be drawn upwardly toward said headrail, and said apparatus comprising;

die support means defining a predetermined axis for passage of strip material therealong for the formation of said blind slats;

a plurality of die means mounted on said die support means, at least some of said die means being moveable therealong, said moveable die means including a first moveable die means, and a plurality of subsequent moveable die means, said die means being aligned with one another along said axis whereby a said strip of said material may pass therealong;

first moveable die movement means connected to said first moveable die means and operable to move said first moveable die means a first predetermined distance;

means interconnecting said first moveable die means and its next adjacent said subsequent moveable die means;

respective further moveable die connection means connecting between respective further subsequent moveable die means in series whereby movement of said first moveable die means for said first predetermined distance caused by said first moveable die movement means is communicated to all of said subsequent moveable die means such that each of said moveable die means moves a distance different than that moved by its adjacent said moveable die means, whereby at least selected ones of said moveable die means may be precisely positioned along said support means;

die operating means operable to procure selective simultaneous operation of selected ones of said die means while leaving others of said die means inactive;

die control means for selecting those said die means to be operated whereby to form openings in said strip material at preselected spaced points therealong by operation only of those said die means selected by said die control means;

cut off die means for cutting off a preselected length of said strip material to form a said slat for a said blind, and, slat threader means, located downstream of said die support means, for supporting said ladder tapes and defining a predetermined slat threading path for threading a said slat through said ladder tapes.

17. Apparatus as claimed in claim 16 including scissors linkage means interconnecting said moveable die means, whereby movement of said first moveable die means is communicated to all of the remaining said connected moveable die means through said scissors linkage means.

18. Apparatus as claimed in claim 16 wherein all of said die means are operable by a single common power operated means, and including control means for selectively operating individual ones of said die means, through the medium of said common power operated means.

19. Apparatus as claimed in claim 16 and including moveable mounting means supporting said threader means whereby said threader means may be moved relative to said strip axis.

20. Apparatus for the manufacture of blinds of the type having a headrail, a plurality of ladder tapes suspended from said headrail, a plurality of blind slats supported by said ladder tapes, and raise cord means passing through openings in sid blind slats, whereby said blind slats may be drawn upwardly toward said headrail, and said apparatus comprising;

die support means defining an elongated pathway along a predetermined axis for passage of at least two strips of strip material therealong for the formation of said blind slats;

a plurality of die means mounted on said die support means, at least some of said die means being moveable therealong, said die means being aligned with one another along said pathway whereby said strips of said material may pass therealong side by side;

a die operating shaft in each of said die means operable to procure operation of said die means;

at least two perforation dies associated with each of said die means in spaced apart relation for receiving respective said strips therethrough;

at least two perforation die operating members for each said die means, for operating respective perforation dies;

at least two activator means, one for each respective said operating member, whereby one of said activator means may activate one said operating member, while leaving the other said operating member inactive;

control means for selecting certain of said perforation dies to be operated whereby to form openings in a selected one of said strips of said strip material at preselected spaced points therealong, and, cut off die means operable to cut off a length of said strip to form a said slat.

21. Apparatus as claimed in claim 20 including slat threader support means, located downstream of said die support means, for supporting said ladder tapes and defining a predetermined slat threading path for threading a said slat through said ladder tapes.

22. Apparatus as claimed in claim 21 and including moveable mounting means supporting said threader means whereby said threader means may be moved relative to said axes of said at least two strip axes.

23. Apparatus as claimed in claim 21 wherein there are a plurality of said die means, and at least some of said die means being moveable relative to other of said moveable die means and including linkage means interconnecting said moveable die means, whereby movement of one of said moveable die means is communicated to all of the remaining said connected moveable die means and die movement means for moving said linkage means.

24. Apparatus as claimed in claim 20 wherein there are a plurality of said die means, and at least some of said die means being moveable relative to others of said die means and including linkage means interconnecting the same, whereby movement of one of said die means is communicated to all of the remaining said connected moveable die means.

25. Apparatus as claimed in claim 24 wherein said movement connection means causes each of said die means to move a distance different from its adjacent said die means, whereby at least selected ones of said die means may be precisely positioned along said support means, and thereby form openings in said strip material in desired locations.

26. Apparatus as claimed in claim 25 wherein all of said die means are operable by a single common power operated means, and including control means for selectively operating individual ones of said die means, through the medium of said single common operating means.

27. Apparatus as claimed in claim 23 wherein said linkage means causes each of said moveable die means to move a distance different from the distance moved by its adjacent said moveable die means, whereby at least selected ones of said moveable die means may be precisely positioned along said support means, and thereby form openings in said strip material in desired locations.

28. Apparatus as claimed in claim 23 wherein all of said die means are operable by a single common power operated means, and wherein said die control means is operable or selectively operating individual ones of said die means, through said common power operated means.

* * * * *